United States Patent
Calupca et al.

(10) Patent No.: US 9,939,540 B2
(45) Date of Patent: Apr. 10, 2018

(54) SYSTEM AND METHODS FOR REMOTE MONITORING

(75) Inventors: Thomas Calupca, Lansing, NY (US); Christopher W. Clark, Ithaca, NY (US); Sam Fladung, Ithaca, NY (US); Amanda Kempf, Ithaca, NY (US); Matthew Robbins, Brooklyn, NY (US); Eric Spaulding, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 14/239,374

(22) PCT Filed: Aug. 19, 2011

(86) PCT No.: PCT/US2011/048443
§ 371 (c)(1),
(2), (4) Date: Aug. 31, 2015

(87) PCT Pub. No.: WO2013/028157
PCT Pub. Date: Feb. 28, 2013

(65) Prior Publication Data
US 2016/0070010 A1   Mar. 10, 2016

(51) Int. Cl.
*G01V 1/00* (2006.01)
*A01M 31/00* (2006.01)
*G01V 1/22* (2006.01)

(52) U.S. Cl.
CPC .......... *G01V 1/001* (2013.01); *A01M 31/002* (2013.01); *G01V 1/22* (2013.01); *G01V 1/008* (2013.01); *G01V 2210/14* (2013.01)

(58) Field of Classification Search
CPC ........ G01V 1/001; G08B 1/08; A01M 31/002
See application file for complete search history.

(56) References Cited

U.S. PATENT DOCUMENTS

| | | | | |
|---|---|---|---|---|
| 4,509,151 A | * | 4/1985 | Anderson | G01V 1/20 367/118 |
| 2001/0034585 A1 | * | 10/2001 | Corby, Jr. | G02B 23/2484 702/184 |
| 2004/0218609 A1 | | 11/2004 | Foster et al. | |
| 2004/0233055 A1 | * | 11/2004 | Canich | G06Q 10/08 340/539.26 |
| 2006/0241916 A1 | * | 10/2006 | Sieracki | G10L 25/00 702/19 |
| 2009/0273467 A1 | * | 11/2009 | Elixmann | A61B 5/1112 340/539.12 |
| 2010/0046326 A1 | * | 2/2010 | Lovik | G01S 7/539 367/87 |
| 2010/0067326 A1 | * | 3/2010 | Iranpour | G01V 1/3808 367/20 |
| 2010/0246331 A1 | * | 9/2010 | Paul | F16L 11/086 367/173 |
| 2011/0035491 A1 | | 2/2011 | Gelvin et al. | |

* cited by examiner

Primary Examiner — Hovhannes Baghdasaryan
(74) Attorney, Agent, or Firm — Valauskas Corder LLC (57) ABSTRACT

A system that detects signals and transmits data regarding certain detected signals for further analysis is disclosed. The detected signals may be analyzed to determine whether any of the detected signals correspond to a source. The system may transfer in near-real time data and information regarding the data to one or more client devices. Methods for detecting signals and transmitting data associated with the detected signals are also disclosed.

16 Claims, 10 Drawing Sheets

SYSTEM AND METHODS FOR REMOTE MONITORING

FIELD OF THE INVENTION

The invention relates generally to a system for the remote monitoring of geographical areas. More specifically, the invention relates to a system that collects and processes data and can provide information to a user about the data collected. In certain embodiments, the system can be used to perform enhanced processing of collected data in near-real-time to identify whether an event has taken place or a state has been established and provide information to a user of that occurrence.

BACKGROUND OF THE INVENTION

A variety of systems and methods are known by which information regarding the environment can be collected. Detectors, for example, can identify the presence of a human or an animal, the occurrence of an event, or the state of the environment. Humans, animals, or environmental phenomena can generate sound that can be detected. These sounds or audio signals typically have specific characteristics by which the source of the signal can be detected. For the purposes of this invention, "source" refers to any species of animal, object, act, or phenomena that may generate a signal in a detection area of a detection device. The source may be mobile—such as a human, animal, ship, or an environmental condition, such as a weather front or other condition, wave, or iceberg—and therefore have the ability to enter and leave a detection area of the detection device. The source may also be stationary and be present the entire time within the detection area at the time of detection. An example of a stationary source would be a portion of the earth within the detection area that experiences a seismic event—such as an earthquake—or an eruption—such as the appearance of a new volcano or activity from an existing volcano. Detection devices for capturing signals may be strategically placed in different locations in a geographical area to provide monitoring coverage for that area. For purposes of this invention, "signal" refers to any event, because of which data may be collected by a detection device.

Once the data is collected, it is often desirable to transmit that data or information regarding that data to one or more destinations. However, conventional systems for detecting and analyzing signals, and then transmitting data or information about such data to the one or more destinations are often problematic. For example, such conventional systems often do not have the necessary communication infrastructure to achieve a seamless transfer of data or information from the collection location to the one or more destinations. Also, conventional collection systems often cannot process the data according to specific parameters and provide that data or information to a user in a timely manner.

Other conventional systems rely on human interaction to transfer information between a collection location and one or more destinations. This type of processing of data can cause delays in the transfer of information to the one or more destinations, which may prevent users from being able to use the information or simply always provide largely outdated information to users.

Accordingly, there is a need for a system and methods by which the signals generated by a wide variety of sources may be detected, the data generated thereby be analyzed according to pre-set parameters or newly set parameters, and the data and the information regarding the data distributed to one or more recipients in a timely manner.

SUMMARY OF THE INVENTION

The technical problem according to the invention relates to the inability to efficiently transfer data from a data detection device to an analysis device for analysis of the data, and then to transfer the data, or information about the data to one or more destinations or client devices in a timely manner. For purposes of this application, a client device may be a client computer or may be one of many different types of personal digital assistants, smart phones, tablet, or other device that include communication features.

The solution to the technical problem includes the design and development of a system and methods that utilize automated analysis and information transfer components to provide data and information to the client device in a near-real-time manner. The invention provides a system and methods that enhance communication between a data detection device and a client device by utilizing a plurality of communication links that can utilize different types of communication systems or modes when one type of communication link has problems or fails.

Certain preferred embodiments of the present invention include a detection system having one or more data detection devices that monitor an area for a source. The source may be any species of animal, object, act, or phenomena that may generate a signal in the detection area of a detection device. Moreover, the source may enter the detection area or be located in the detection area. The detection devices may include sensors, transducers, microphones, and hydrophones. One embodiment of the detection system may include components by which the data is automatically transmitted in "near-real-time" to a communication infrastructure that has multiple communication links, and then analyzed by a processing device. Another embodiment of the detection system may include components by which the data is collected and analyzed and then sent in whole or as needed through the use of a communication infrastructure that includes multiple communication links. For the purposes of this application, "near-real-time" refers to a time frame for a process that is automated by a computer system, except for possible time losses in instances where an operator performs verification of the sources determined by the processing device to have generated one or more of the signals. One of the many types of data detection devices that may form a component of the system of the present invention is any type of acoustic detection device that detects audio signals for further processing and analysis.

The processing device may include one or more servers that process and analyze the data obtained by the data detection device, for example, to determine the location of the detection device, the location of the source, the type of source that may have generated the signal, the possible movements of the source if it is mobile, and the environmental state of the detection area (such as temperature, or, if underwater, salinity or other water condition, or, if on ground, humidity or other atmospheric condition). Whether a processing device can produce the data from which a certain determination can be made will depend on whether the device is pre-set or later configured to process the data as needed. For example, the processing device can be configured to determine whether a specific species of animal generated one or more of the signals. In other instances physical objects generating audio signals, such as submarines or vessels may be selected.

The one or more destinations receiving output from the processing device can include a client computer, hand-held computing device such as a tablet, smartphone, etc., or any other computerized device capable of receiving information or data transferred from a computer system or network. Generally, the one or more destinations include any destinations that information would be desired depending on the type of detection performed. In the case of a terrestrial application of the invention where trespassers of a property outside of a residence are determined as sources, the one or more destinations may include multiple destinations, such as to a smartphone of the owner of the residence being trespassed upon and a computer network of an alarm system company.

It is envisioned that the system and methods of the present invention can be utilized in a variety of ways, including detection of endangered species, remote firearm/poaching detection system, terrestrial applications with associated microphones for air-based signals, animal population census applications, vehicle detection systems, explosion detection systems, animal including human detection systems, audio band amplitude detector and environmental exposure monitoring, geophone integrated versions for vibration/earthquake monitoring, remote analog-signal event detection, remote radiation detection, equipment malfunction detection system, tsunami warning systems, or other supervisory control and data acquisition (SCADA) type applications.

The described embodiments are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

DESCRIPTION OF THE DRAWINGS

The preferred embodiments of the invention will be described in conjunction with the appended drawing provided to illustrate and not to the limit the invention, where like designations denote like elements, and in which.

DETAILED DESCRIPTION OF THE PREFERRED EMBODIMENT

Although a number of embodiments of the invention will be described in the following, it is understood that these embodiments are presented by way of example only, not limitation. The detailed description of the exemplary embodiments of the invention should not be construed to limit the scope or breadth of the invention.

The invention relates generally to a remote detection system. Different sources, such as humans, animal species, or objects, acts, phenomena, etc. generating signals may be detected by the system and analyzed to determine information. Moreover, embodiments of the system can be configured to facilitate monitoring different environments and areas. It is envisioned that the present invention may be utilized in aquatic, terrestrial, extraterrestrial, and atmospheric environments. It is understood that the particular detection device may vary depending on the selected environment as is understood by those skilled in the art.

Figure 1:
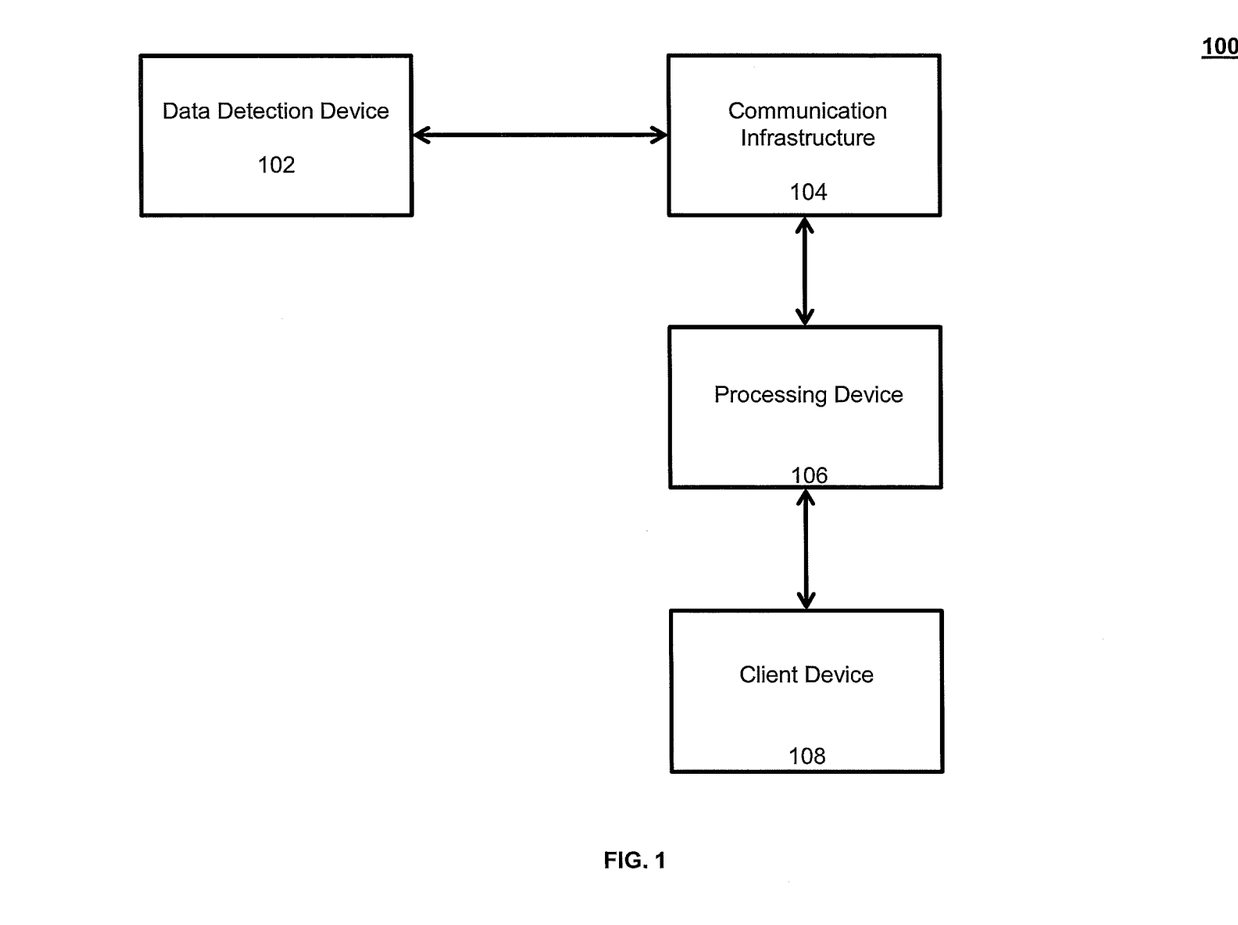
FIG. 1 illustrates a system for remote monitoring according to one embodiment of the invention.

FIG. 1 illustrates an exemplary system, shown generally as 100 for remote monitoring according to one embodiment of the invention. The system 100 includes a data detection device 102 that is connected to a communication infrastructure 104. The system 100 further includes a processing device 106 connected to the communication infrastructure 104, and a client device 108 connected to the processing device 106.

The data detection device 102 is a signal detection and signal capturing device. Generally, different sources generate certain signals that are characteristic of that source. Accordingly, when a source enters or produces a signal within a detection range of a data detection device 102, then the device 102 may capture data associated with that source in the form of one or more signals. In one embodiment, signals are captured using an analog sensor. Another embodiment uses a digital sensor. Yet another embodiment includes both an analog sensor and a digital sensor. In certain embodiments, the captured signals may then be stored at the data detection device 102 for a brief period of time before a transferring of one or more of the signals via the communication infrastructure 104 to the processing device 106.

The communication infrastructure 104 may include different types of communication links including hard line links and wireless links. Exemplary links include satellite links, cellular links including Global System for Mobile Communications (GSM), Code Division Multiple Access (CDMA), Time Division Multiple Access (TDMA), 3G/4G mobile telecommunication applications, plain-old-telephone service (POTS) links, Wifi, LAN, etc. Generally, any type of link that facilitates data transfer between client computers may be used for the communication infrastructure 104. Moreover, certain preferred embodiments include at least two different types of communication links, such as satellite and cellular, in the communication infrastructure 104.

The processing device 106 may include one or more servers. In one embodiment, the processing device 106 may have a communication server and a data processing server. The communication server connects to the data detection device 102, and the data processing server connects to the client device 108. The communication server may parse the incoming data, storing the results in a database and providing interfaces for processing, annotating, validating, and querying the stored information.

One embodiment of the data detection device 102 communicates with the communication server via a number of communication links. The links that are used first may be prioritized based on speed, power efficiency, or cost. Moreover, the data detection device 102 and communication server can be adapted to facilitate transfer of data from a first communication link to a second communication link when a transfer fails using the first communication link. Preferably, the second communication link is a different type or mode of communication link to provide a different way to transfer data, which facilitates rapid transfer of data to the communication server since there is less opportunity for different systems to be not operating at the same time. Moreover, it is envisioned that data partially transferred to the communication server may change links midstream to facilitate transfer of any untransferred data to the communication server.

The data detection device 102 is capable of requesting and executing computer code from the communication server. The computer code may request that the device submit any captured data of interest to the communication server. The communication server may also send code to the data detection device 102 for remote diagnosis and administration of the data detection device 102.

The client device 108 can be any device capable of receiving output data or related information (such as metadata) from the processing device 106 and communicating that output data to an end user or users at the one or more destinations. By way of example, various computer networks formed as parts of vehicles, client computers, or mobile communication devices such as a smart phone or tablet may be used as a client device 108. Moreover, it is envisioned that the output from the processing device can be provided to multiple client devices 108. One advantage of the present system 100 is that in certain embodiments communication between the various components is bi-directional. Thus, information from the client device 108 may transmit to the processing device 106, and vice-versa.

Figure 2:
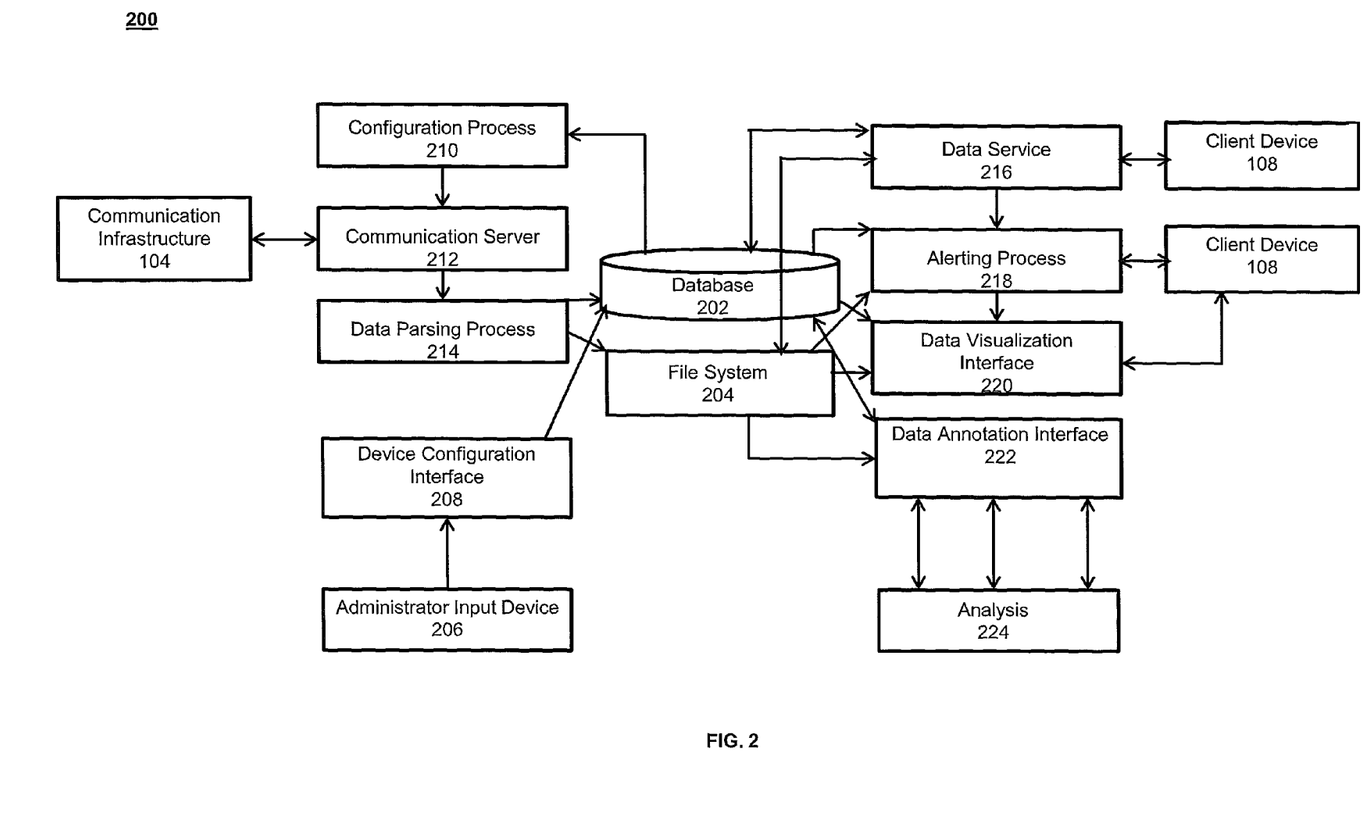
FIG. 2 illustrates a processing device connected to a communication infrastructure and client devices according to one embodiment of the invention.

FIG. 2 illustrates one embodiment of a processing device 200 that is connected to the communication infrastructure 104 and multiple client devices 108. The processing device 200 includes a database 202 and a file system 204. An administrator input device 206 allows an administrator to provide instructions to a device configuration interface 208. The device configuration interface 208 then communicates with the database 202.

The database 202 may communicate with a configuration process component 210 which communicates with a communication server 212. The communication server 212 also receives input from the communication infrastructure 104, and may send information to the communication server. The communication server 212 provides output to the data parsing process component 214, which may be a data processing server. The data processing server may communicate with the database 202 and the file system 204.

The database 202 and file system 204 may communicate with a data service process component 216, alerting process component 218, data visualization component 220, and data annotation interface 222. The database 202 and file system 204 may also receive information from the data annotation interface 222.

An analysis component 224 provides verification of any output from the database 202 via the data annotation interface 222. In one embodiment, a human operator can check the system's analysis of captured data and confirm the accuracy of the data. However, analysis of captured data may also be an automated process that requires no user input. The analysis component 224 may be optional in some systems. However, in those systems using the analysis component 224, the analysis of the database output of determined sources occurs prior to forwarding of the database output to the data service process component 216, alerting process component 218, and data visualization interface component 220.

Figure 3:
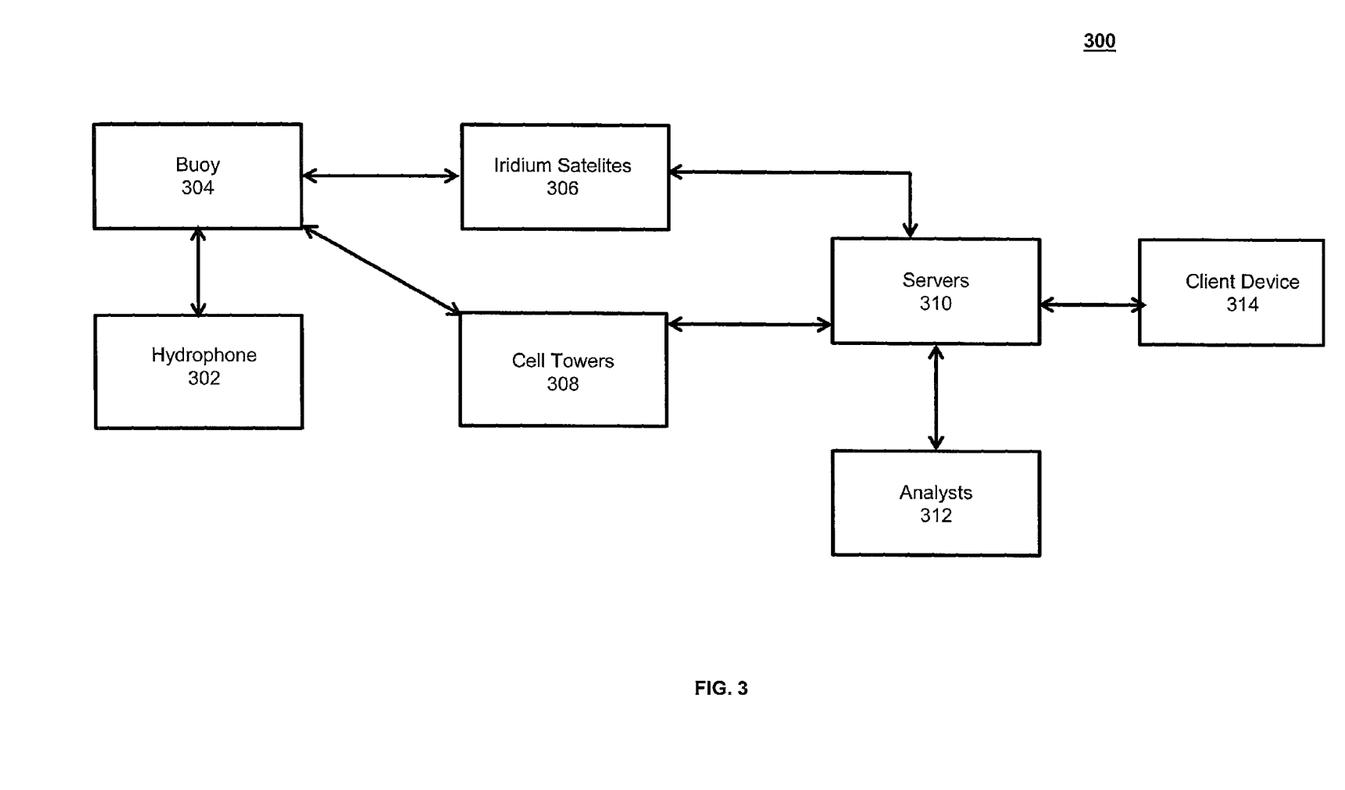
FIG. 3 illustrates an exemplary remote monitoring system for a marine environment according to one embodiment of the invention.

FIG. 3 illustrates an embodiment of the present invention that includes a detection system 300 capable of capturing any underwater signal. The signal may be a sound such as that produced by an animal, a vehicle, a seismic event, an explosion, or any other source that produces an acoustic signal.

The hardware and software infrastructure of the system 300 provide a basis for the deployment of separately developed detection devices for applications in the detection and possible tracking of sources. The modular nature of the hardware and software enable the system 300 to be readily reconfigured to handle detection and analysis of new sources and applications as the need arises.

The illustrated embodiment of the system 300 includes a hydrophone 302 connected to a buoy 304. In certain embodiments, the hydrophone 302 may be physically connected via a tether to the buoy 304. In certain embodiments, the tether can include a first gumby hose connected in series to a hose adapter, sphere, first electromagnetic termination connector, urethane chain, and second electromagnetic termination connector. The hydrophone 302 may have one end physically connected to the second electromagnetic termination connector and the opposite end physically connected to a wererope. The wererope connects in series to a swivel, release with line pack, mooring chain, and anchor. The anchor may rest on the floor of the ocean or other body of water. The buoy 304 digitizes and processes the output of the hydrophone 302. Although one hydrophone 302 and buoy 304 is shown for simplicity, a system 300 may have multiple buoys and hydrophones. This equipment may be spaced apart to detect sources in a larger area.

The auto-detection buoy 304 keeps a running tally of the ten highest-scoring audio signals. In certain embodiments for every predetermined time period, for example twenty minutes, the buoy 304 attempts to transmit a satellite phone call via an Iridium satellites communication link 306 or preferably a cell call to a cell tower 308 communication link to transmit audio signal data to one or more servers 310. A cell call tower 308 is generally a less expensive way to transmit data than via the Iridium satellites communication link 306. The servers 310 upload the most recent top-ten list of audio signal data from the buoy 304, and clear the memory of the buoy 304 so that the buoy 304 can begin generating a new top-ten list of captured audio signals. The analyzed audio signal data may then be verified by analysts 312, and once verified, information collected from the audio signal data can be provided to a client device 314.

While a variety of signal detection system may be formed with the components of the present invention, for ease of understanding the invention, a specific example is now provided related to detection of a certain type of whale (a "right" whale) to simply identify the presence and number of such whales and possibly to prevent mishaps or collisions between the whales and vessels.

Generally, when a right whale swims near the shipping lanes used by vessels, the whale may occasionally make "up-calls" to communicate with other right whales in the area. Captains of vessels often cannot see the whales early enough or at all to avoid collisions. This visual identification of a possible water hazard is particularly problematic when visibility is low or at or after sunset.

A specific example of a system 300 by which a determination of whether a source entering or present in a detection area is a right whale is now explained. Generally, the system 300 is designed to notify in near-real-time a vessel's captain or crew that the whale is located near a vessel travelling in the ocean monitored by detection devices. The system 300 may have a modular hardware and software infrastructure for the near-real-time acoustic detection of right whales. Near-real-time detection of a species such as the right whale is desired to track the movements and presence of that species for monitoring, noise pollution mitigation, and vessel collision reduction. The present embodiment of the system 300 advantageously provides greater flexibility in the number of species that can be monitored and the methods by which the data captured as audio signals may be transmitted to one or more destinations such as a client device 314. Although one client device 314 is shown, it is understood that additional client devices (not shown) may be connected to the system 300.

Figure 9:
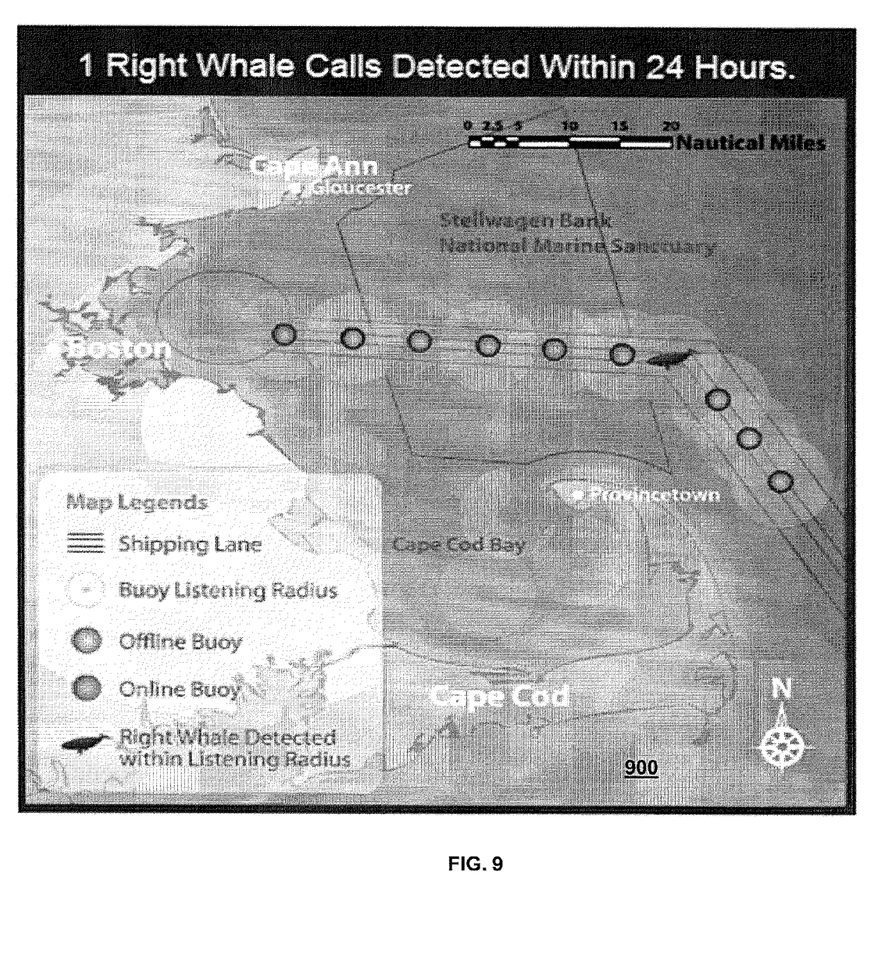
FIG. 9 illustrates an estimated source location GUI according to one embodiment of the invention.

Certain embodiments of the system 300 may include multiple buoys 304 and associated hydrophones 302 spaced in a geographical area to detect right whales in or near certain shipping lanes (see FIG. 9). The preferred auto-detection buoys 304 installed in the shipping lanes may monitor the water for right whale calls 24 hours per day. Calls from right whales within about 5 nautical miles are loud enough to be recorded on the buoy's hydrophone 302, which may be mounted about sixty to one-hundred and twenty feet beneath the surface of the ocean.

Preferably, all day every day, a computer on each auto-detection buoy 304 receives and detects sounds or audio signals as they arrive from a detection area about the buoy 304. In certain embodiments the system 300 focuses on audio signals having a frequency between 50 and 350 Hertz. The system 300 may also separates discrete sounds from background noise.

Next, the system 300 estimates similarity of each audio signal to a right whale up-call. The system 300 assesses multiple audio characteristics or parameters such as starting, minimum, and maximum frequencies, and the audio signal's duration. Other possible parameters include the amplitude, bandwidth, and frequency of an audio signal. For right whales, whale up-calls are typically about one second long and rarely longer than two seconds. One embodiment of the system 300 assigns each two second segment of audio signal a score between one and ten, with higher numbers indicating the audio signals sound more like a right whale. Audio signals that score less than six usually indicate that the captured audio signals were not generated by right whales.

Ten audio signals per buoy transmission signify a ten-buoy array can yield up to 100 two-second audio signals or clips every twenty minutes. But some of the audio signals may not correspond to right whale audio signals. Humpback whales, especially, can sound like right whales. Other up-call-like sounds can be made by fish or by manmade objects. Thus, the system 300 may be intentionally calibrated to allow some of these non-right whale audio signals pass through the system to the servers 310 to capture any odd-sounding right whale audio signals. Such captured signals may then be transferred to and further processed via servers 310 and an analysis component 312 to make a final determination whether each of the audio signals corresponds to a right whale or not. In certain embodiments the analysis component 312 may refer to a library of right whale recordings and compare a transmitted audio signal to those recordings. This analysis may automatically occur by use of audio analysis algorithms.

Normally, between fifty and four-hundred audio signals may be transmitted to and uploaded to the servers 310. The number of false detections—which the analysis module 312 must sift out from true up-calls before issuing an "alert"- depends partly on whether right whales are nearby. That is because an embodiment of the system 300 may rate real right-whale calls very high, resulting in a limited margin of error for false detections on a buoy's top-ten list of audio signals. An "alert" is an indication that a source has been detected in one or more detection areas. (See FIG. 9).

One possible recipient of right whale alerts is the vessel or client device 314 passing through the shipping lane to or from a harbor. When vessels enter the shipping lanes near the harbor, the system 300 may be configured to monitor buoy reports all the time and provide output from the servers 310 to the client device 314. The reports may include data and associated metadata for detection signals, as well as environmental sensor data and battery status of the buoy 304. The analysis component 312 may continuously issue updates to inform any vessels in the shipping lanes which of the buoys 304 have detected audio signals that correspond to a right whale within a specific past time period, such as the last twenty-four hours. Alternatively, instead of continuously providing updates, the analysis component 312 may provide updates at certain time periods, such as every twelve hours. The updates may be made available to any vessel via the Right Whale Sighting Advisory System (SAS) operated by the National Oceanic and Atmospheric Association (NOAA). The updates may be available online and distributed by various communication links to client devices 314, such as e-mail. The updates may also be incorporated into marine safety bulletins.

When a vessel bound for a harbor approaches a buoy 304 that is on alert, which may include a buoy 304 that has detected a right whale within a specific time period, then information about the alert is provided to the vessel and they may take appropriate action.

In an alternative embodiment of a system for remote monitoring, the system may provide autonomous detection signal monitoring for a source. The system may include integration with a marine mooring and hydrophone platform. A hydrophone placed in an aquatic environment such as an ocean provides an acoustic signal into an electronics package stored on or within a buoy. The acoustic signal may be conditioned and digitized by an analog-to-digital converter. In certain embodiments, an onboard detection algorithm may evaluate the conditioned and digitized signal and identify detection candidates or sources. The onboard detection algorithm may rank and store the detection candidates in a memory as two second clips of audio signals along with metadata. When a buoy is to report, top-ranking detection events (e.g., captured audio signals) may be packaged and transmitted to a shore-side server along with metadata. The detection events may be evaluated using an annotation interface to identify the detection events as either "rejected" or "confirmed". If a clip is confirmed, the buoy at which the detection event occurred is placed "on alert" so that client devices may be notified.

The status of each buoy is either "offline", where no data is received within the time window, "online" where data is received, but no clips have been confirmed in the time window, or on "alert" where data is received, and clips have been confirmed in the time window. In certain embodiments, the status of each buoy is preferably displayed on a series of web interfaces, and relayed to vessels to prevent collisions with marine animals. In certain embodiments the buoy status may also be accessed via a raw data service link.

Figure 4:
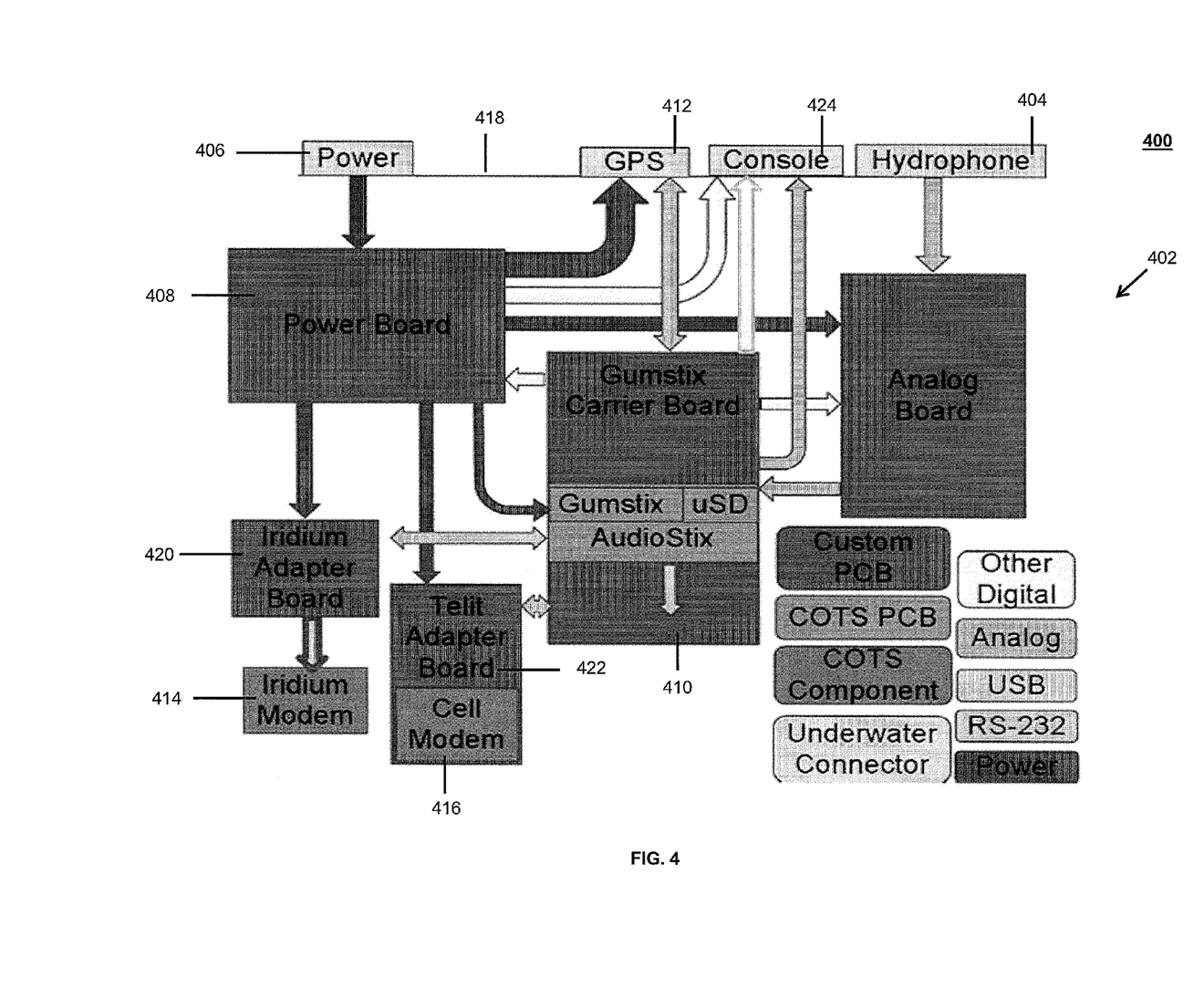
FIG. 4 illustrates a system diagram according to one embodiment of the invention.

FIG. 4 illustrates a system 400 diagram according to one embodiment of the invention. The key electrical systems are divided into separate modules as shown in the figure. The analog front end shown generally as 402 conditions the hydrophone signal from the hydrophone 404 for digitization, and the power source shown as battery power 406 is regulated and distributed by a power board 408. The analog front end 402 allows the system 400 to be configured to a variety of signals, and other environmental sensors such as temperature and salinity sensors may be connected to the analog front end 402 to provide context for detected audio signals. The signal processing and data reporting work is performed by a Gumstix computer module 410, which drives the GSM/GPRS or Iridium satellite modems via RS232. A GPS module 412 enables drift detection and asset tracking, and provides a sample-accurate audio time reference. Preferably, the GPS provides both location information and a sub-microsecond time reference, which may be used to localize captured detection signals via server post-processing. To conserve power, the Iridium modem 414, cellular modem 416, and GPS receiver may be switched off individually when not needed. This switching may more than double the run time since the modems 414, 416 draw more power than the computer, even in standby. Communications from the system 400 are provided by the pair of modems 414, 416. The modules may communicate with each other over an I²C bus 418. The system 400 may report both on a fixed schedule, and when detection signals of interest are detected. Servers, such as servers 310, may remotely update a reporting schedule, detection algorithms, and system embedded software.

The Iridium satellite modem 414 provides global coverage while a quad-band cellular modem 416 provides for higher bandwidth and cheaper data costs when the connection is available. The modems 414, 416 are each mounted to custom adapter circuit boards 420, 422 respectfully that interface the modems to the rest of the system 400.

The computing for this system 400 is provided by the Gumstix single board computer module 410 running Linux. An adapter board connects the computer module 410 to the rest of the system 400, breaking out the I²C bus 418 and USB, and adding two USB-driven RS-232 serial ports. The computer module 410 boots from a micro-SD card, enabling simple field-replacement of the firmware, which is stored on the detection device. The microSD card also allows for some on-board storage, which can easily be expanded by adding an external USB hard drive or other USB storage device.

Since the system 400 includes a battery-powered power source 406, the system 400 is preferably designed to tolerate a wide voltage range and to minimize current draw. The dedicated power board 408 provides efficient DC-DC conversion from a wide range of input voltages down to the voltages needed for the system. Input voltages from 14.5V to 36V will power the entire system 400, and for voltages down to 7V, the computer and modems 414, 416 will still operate, allowing the system 400 to make full use of the power source 406. In other embodiments the power source need not be battery powered, and may be a municipal fixture, for example.

Reverse polarity and over-voltage protection are provided by a surge stopper IC which drives a pair of back-to-back MOSFETs, preventing damage in the event of an incorrectly wired battery connector.

The power board 408 may have five high-side switchable power ports. Each port supplies ground, battery voltage, 12V and 5V rails, and an ID resistance input pin. All three power lines to a given port are switched simultaneously. This design allows the power switching logic to be decoupled from the individual device voltage requirements. The switch inputs are driven by an on-board PIC microcontroller, which accepts switching commands over the system's I²C bus 418. In order to detect cable routing errors, each type of client board is fit with a unique-valued resistor between the ID pin and ground. The microcontroller reads the value of this resistor and reports assignment mismatches to the computer, facilitating assembly debugging.

The electronic components of the system 400 are preferably contained within a sealed plastic enclosure, designed to be either submersible or mast mounted. The enclosure is depth rated, and painted with a UV resistant coating to prevent sun damage. The enclosure contains the modems 414, 416, computer module 410, analog board and other components of the system 400. The hydrophone 404, antennas, a GPS receiver and a power source are connected via keyed underwater connectors (one shown), which are chosen such that each connector is of a different size, avoiding accidental misconnection when assembling the buoy and hydrophone.

The analog front end 402 processes the raw hydrophone signal from the hydrophone 404 with a software-selectable first or second order AC coupled high-pass filter. The second order filter suppresses low frequency noise such as that from the mooring or the movement of the hydrophone 404 in the water column. The first order filter offers less suppression of these noise sources, but provides a flatter low-frequency spectrum, and enables detection of lower frequency signals. Subsequently, a programmable gain amplifier provides a software-controllable gain stage, and a second order anti-aliasing filter cuts high frequency out-of-band noise, readying the signal for the audio codec. The pass band of this default analog front end is from approximately 5 Hz to 20 kHz.

The system 400 provides a console 424 for communication access through both a wireless and a wired console port. The wireless port may use a ZigBee module and has a range of several hundred feet. The wireless port is primarily used for confirming the operation of the system 400 immediately after deployment of the buoy and hydrophone and for connecting during maintenance at sea. The wireless module is kept in a power-saving mode for most of the time and may wake up every 10 seconds for a few milliseconds to check for a signal. If no signal is received, then the system 400 returns to power saving mode. Run with this duty cycle, the power consumption of the wireless link is negligible when not in use. The wired console provides a direct serial link to the computer module 410. The wired console has a higher data rate than the wireless console and provides better fidelity. The wired console connector also provides an audio line, which field technicians can use to verify that the hydrophone and cabling are functioning properly.

The embedded computer software of the system 300 is made up of several intercommunicating component programs. The software architecture follows an asynchronous producer/consumer model with each component consuming data from a raw data source or shared input buffer and placing processed data in an output buffer or sink.

Inter-process communication is handled mainly through a file system naming convention, with various files and directories serving as shared buffers and locks. This design makes it possible to "drive" the system manually from the command line, as well as from the server with minimal code dependencies. The detection engine processes audio data and produces a database of detected event times, metadata, and audio signals.

Figure 5:
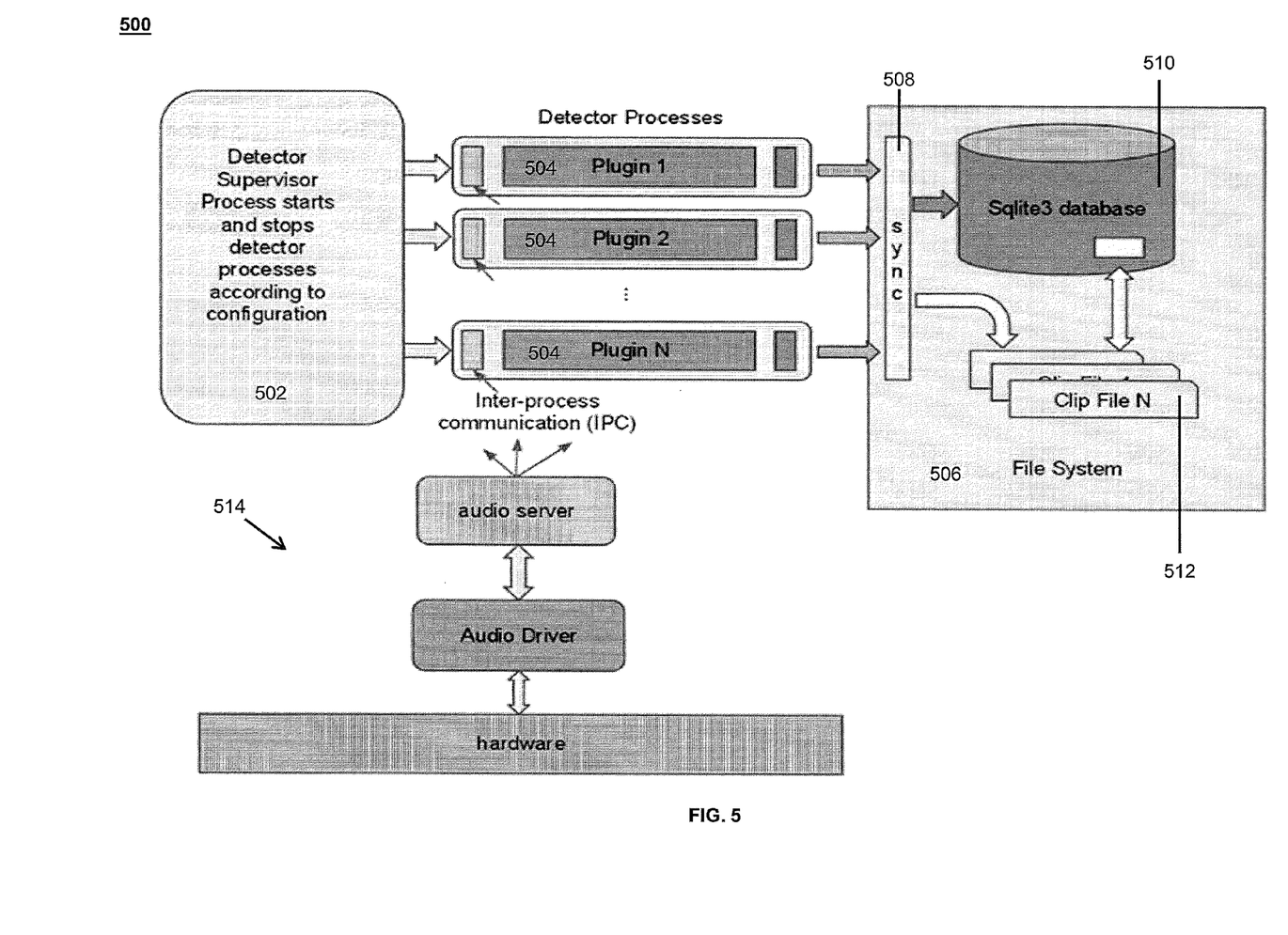
FIG. 5 illustrates an inter-process communication according to one embodiment of the invention.

FIG. 5 illustrates one embodiment of an inter-process communication, generally designated as 500. A detector supervisor process 502 starts and stops detector processes according to a configuration. Data is then provided to a series of plugins 504. The plugins 504 may then transfer data to a file system 506. The file system 506 may further include subcomponents such as a synchronization module 508, a database 510, and a number of clip files 512. Data may be transferred from the plugins 504 and synchronized by the module 508 for transfer to either the database 510 or clip files 512. Data may also be transferred between the database 510 and the clip files 512. In one embodiment, audio may be considered the inter-process communication 500 as shown generally by 512.

The status daemon maintains a separate database of critical system properties, sensor values, debugging information, and system metadata, stored in the same directory. The reporting daemon compresses the detection and status files, storing the resulting archives with time-stamped file names in a separate directory. The servers 310 retrieve this queue of archives upon successful connection.

The detection subsystem (run detect) may be a daemon process group of one supervisor and additional processes for each detection device algorithm. The detection device stores audio signal or data to an SQLite database file as the audio signals are detected. Audio signals may be stored as rows containing time/frequency bounds, score, detector specific metadata, and references to audio data signal files written in the same directory as the database file. A voluntary lock file protocol ensures that database/file system operations are atomic, and also allows the reporting daemon to hold off the detectors from writing new data during archiving.

The detector algorithm code is separated from the core. A software architecture detection engine is provided through the use of dynamically-loaded library "plugins", and a processing application programming interface (API) ensures that new algorithms can easily be written without regard to the underlying engine implementation. The set of active detector plugins and their parameters can be updated at runtime by modifying a configuration file, which the supervisor process monitors, killing and forking new processes if the set of specified plugins changes.

Run detect may use "Jack" (jackaudio.org) as its interface to the audio hardware. Jack's shared memory server/client model allows detector plugins and other processes to efficiently share the audio device. Further, because it is designed for low-latency audio work, Jack is a real time scheduled interrupt-driven audio engine, providing sample accurate timing information from the system clock.

The reporting daemon supervises reporting to the servers 310. When triggered by the presence of a particular predetermined file in the file system, the reporting daemon attempts to contact the servers 310, dispatching modem-specific helper scripts in priority order. Priority is given to the global system for mobile communications (GSM)/general packet radio service (GPRS) network due to its higher bandwidth and lower data cost. This behavior causes the reporter to switch dynamically to the Iridium satellite' communication link 306 in the case of low GSM/GPRS signal strength.

The trigger file is placed on a regular schedule by the reporting daemon, but it also may be written at any time by the detection engine if a high-scoring event is detected, enabling the system to rapidly report critical acoustic events.

Upon establishing contact, the contents of the data storage directory are compressed to an archive in a separate directory, and the archive file is transmitted to the servers 310. Report attempts will continue until the archive storage directory is empty.

In addition to detector plugins, a recording program, also using Jack, may continuously store accurately time-stamped audio archive files to bulk storage. This audio data can be used post-deployment for offline detection device performance analysis and development, and as supplemental audio context, retrieved by the server mid-deployment for audio signals which the human analysts are unable to verify.

The system 300 may incorporate several error recovery mechanisms. A built-in 60-second watchdog on the single board computer resets the computer module in the event of a hard lock-up. Furthermore, a daily cron job forces a soft reset if communication has not been established. These two features provide a measure of safety against inevitable program and user errors.

The buoys 304 may communicate with the servers 310 using "Kermit" (http://www.columbia.edu/kermit/), to provide a common interface over both the GPRS and Iridium networks. When operating on the GPRS network, each buoy 304 may establish a TCP/IP connection using PPP and Kermit in telnet mode. To make full use of the limited Iridium bandwidth, the buoy 304 dials a modem bank managed by the servers 310, and communicates using Kermit's native protocol. In both cases, once the connection is established, both the buoy 304 and the servers 310 perceive only Kermit. Through its scripting facility, Kermit also allows the download and execution of arbitrary code from the server, obviating the need for any rigidly-defined procedure. Rather, upon establishing the incoming connection, the servers 310 send and execute a set of Kermit scripts on the buoy 304. Usually, the scripts contain only instructions to indicate successful communication preventing a watchdog-triggered soft reset, download archived detector data, and upload new reporting and detection configuration files. However, it is also possible to perform remote software updates, change the reporting schedule, retrieve log files, or any other task that can be scripted. Furthermore, the servers 310 can remotely query a buoy identity, and run unit-specific commands in addition to the standard indicate/retrieve/update sequence.

Though running arbitrary code on the remote system 400 of the buoy carries a substantial risk of rendering the buoy 304 unresponsive, the flexibility of this design allows for the buoy 304 to be drastically reconfigured while deployed, and may be effective in unexpected situations. For example, it is possible to construct a unit-specific script for a drifting buoy 304 with a failing GPS receiver to query the buoy location using the Iridium modem. Accordingly, the present communication system 300 is useful and flexible over many long-term deployments.

Each report file received by a buoy 304 may be decompressed and processed using a data parser written in Python. Each of the top-ten detected and captured audio signals results in a series of file assets (e.g., audio clip files and spectrogram preview images), and metadata (date/time, score, feature vector, algorithm, etc.). In addition, each report may contain the last GPS location, battery voltage, and other status information for determining the health and status of the deployed buoy 304. The file assets may be stored on scalable storage, and the metadata may be inserted into a relational PostgreSQL database. This data may then be made available via Apache, PHP, and Django by a number of web and data interfaces. Additional server-side processing may be performed on the detected audio signals, for example, to group detected audio signals from multiple buoys for localization, or to run additional signal processing algorithms on the incoming audio signal data.

Figure 6:
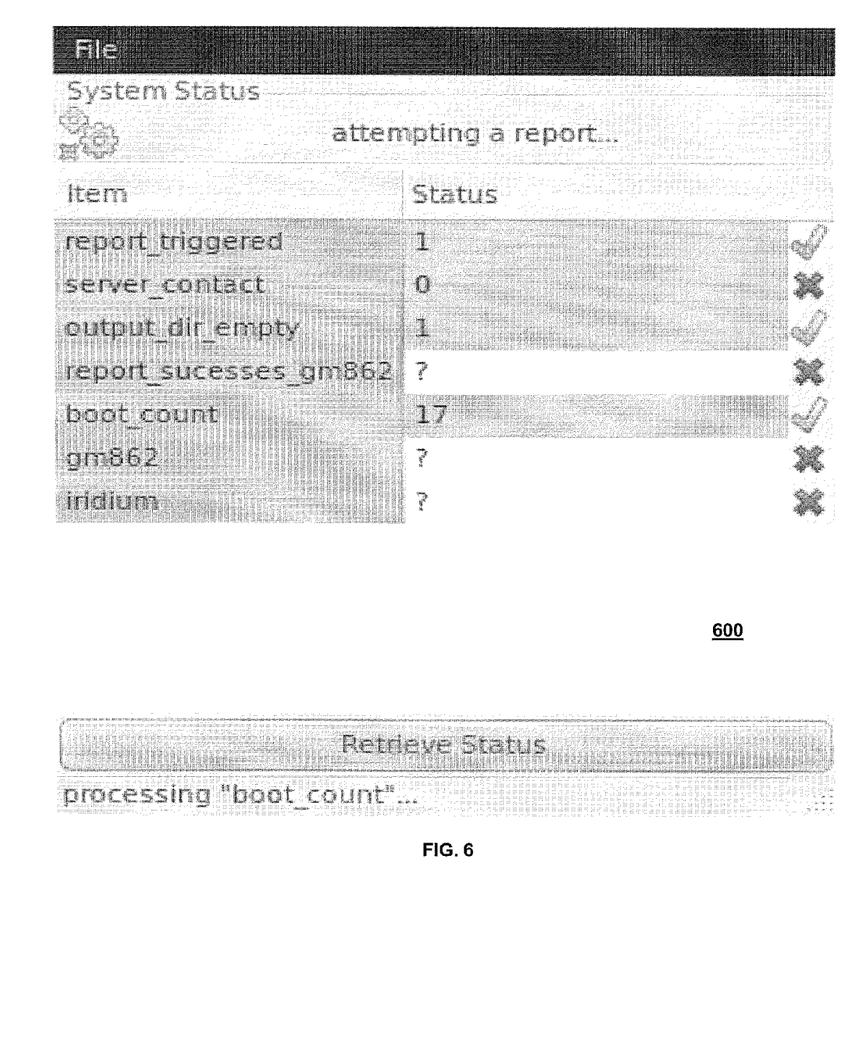
FIG. 6 illustrates a graphical user interface (GUI) for monitoring a data detection device status according to one embodiment of the invention.

A graphical user interface (GUI) 600 for monitoring a data detection device status according to one embodiment of the invention is shown in FIG. 6. The GUI 600 provides basic visualization of the buoy status during pre-deployment preparation and debugging. For more complex debugging, the GUI 600 may be bypassed and a full Linux console can be accessed.

Figure 7:
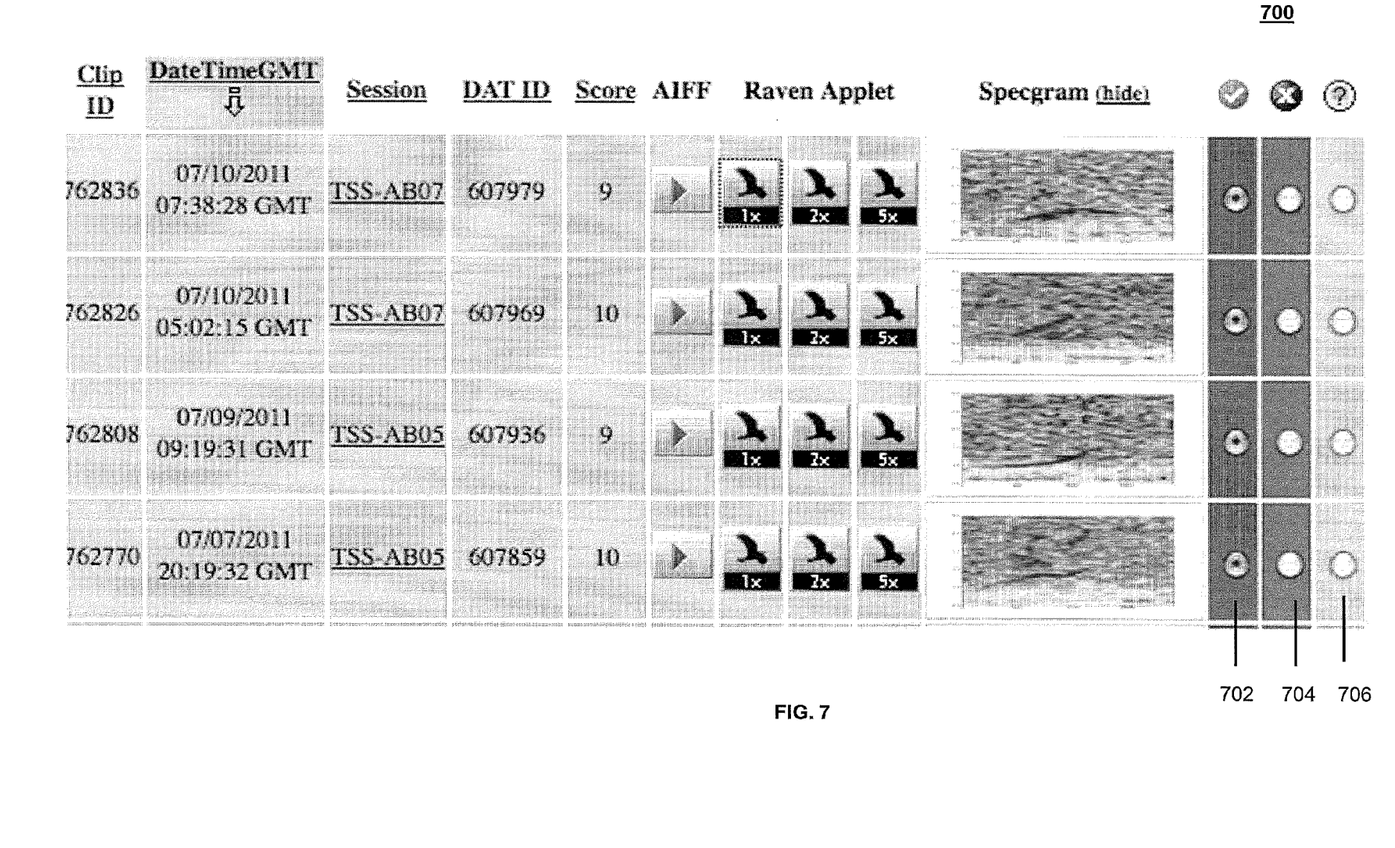
FIG. 7 illustrates an analyst interface according to one embodiment of the invention.

Since the detectors are not infallible, expert analysts may be placed in the loop to reject or accept detection events. Analysts may be human operators that can be notified when detected audio signals are received for their review by various ways of communication such as email or text message. When reviewing the detection candidates, analysts can review and annotate these data remotely using a web analyst interface 700 as shown in FIG. 7. An analyst using this interface 700 may use the static spectrogram previews, explore and listen to the audio signals using for example a Raven applet, determine if each source is a true or false positive, and annotate accordingly by selecting one of the true check box 702, x-false positive check box 704, or uncertain check box 706. When a detection is confirmed, that buoy 304 is said to be on 'alert' (see FIG. 9). The analyst may verify and reject or accept a source determination by using web-based exploration and visualization tools.

Figure 8:
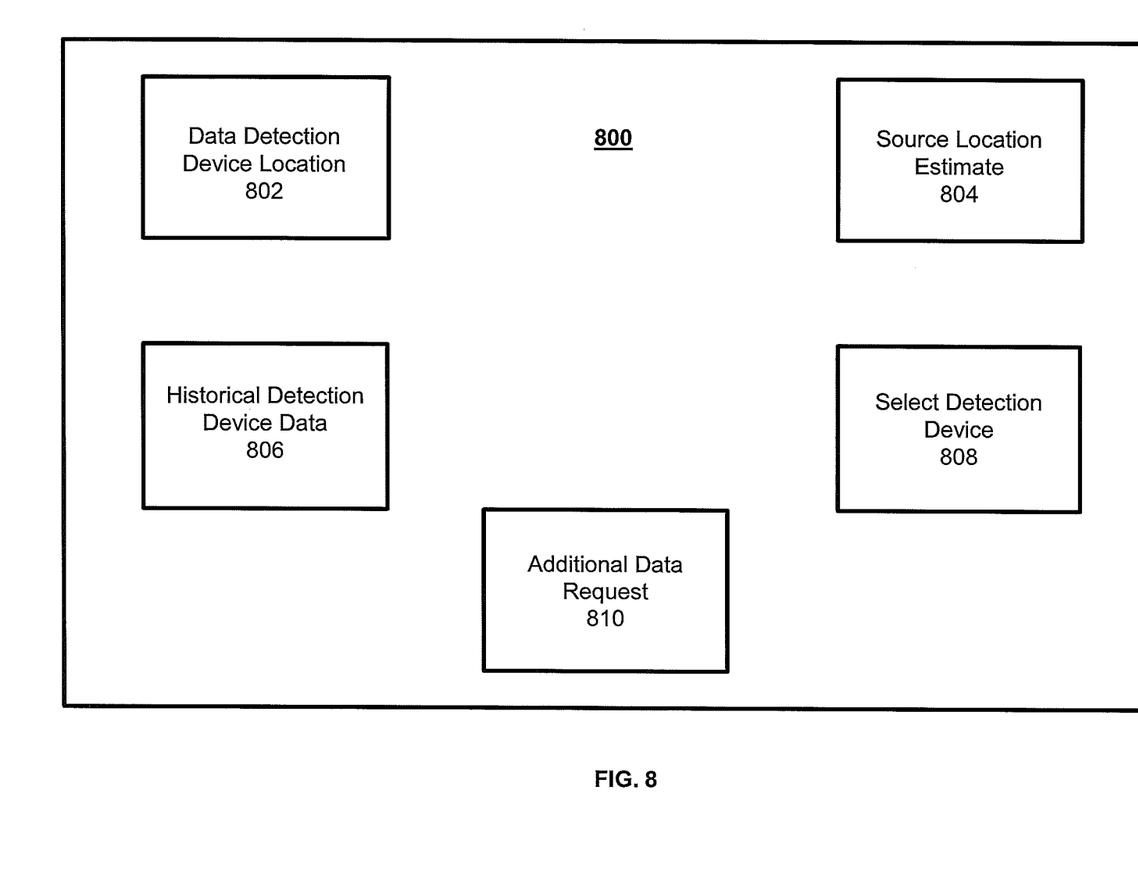
FIG. 8 illustrates an interface of a client device according to one embodiment of the invention.

Turning now to FIG. 8, an interface 800 of a client device according to one embodiment of the invention is shown. The interface 800 may be the interface of a smart phone, tablet, or client computer, for example. The interface may include one or more selection buttons for providing a visual display of data captured and analyzed by the remote monitoring system. The present interface 800 includes a data detection device location 802, source location estimate 804, historical detection device data 806, selection detection device 808, and additional data request 810 selection buttons.

The data detection device location selection button 802 allows selection of one of the data detection devices and provides information about the location of the detection device. The source location estimate selection button 804 when clicked on generates information about the estimated location of a source. Upon user selection of this button 804, a GUI such as the estimated source location GUI 900 shown in FIG. 9 may be provided and show which of the buoys have been placed on "alert" such as the buoy location showing a whale icon to indicate that a source (e.g., right whale) has been detected in the vicinity of the buoy. While FIG. 9 shows the location of a whale relative to the buoys, it is understood that more sophisticated detectors such as satellite imagery may provide further pinpoint accuracy of the location of a source depending on the capabilities of the detection device.

The historical detection device data selection button 806 may provide a user with historical data. Such information would prove useful for understanding seasonal migrations of certain species. For example, it is known that right whales frequent shipping lanes near Boston harbor during parts of the Spring and Summer seasons. Shipping companies may use the historical data to minimize shipping in this area during the specified seasons to prevent mishaps and delays in shipping.

The select detection device selection button 808 allows a user to review data associated with a particular detection device. Thus, if one of the detection devices is on "alert", then a user may desire further information and up-to-the-minute updates regarding the type and possible numbers of a species being detected by the detection device. The user may also select the additional data request button 810 to receive additional information related to any "alerts" or other information that may benefit the user.

Using one or more client devices in combination with the other components of a system like that of FIG. 3 may provide timely detection information which may be distributed to mariners, researchers, or other users of the system via Flash-based web interfaces, Keyhole Markup Language (KML)/Google earth, email reports, phone calls, text messages, and Automatic Identification Systems (AIS) broadcasts.

Figure 10:
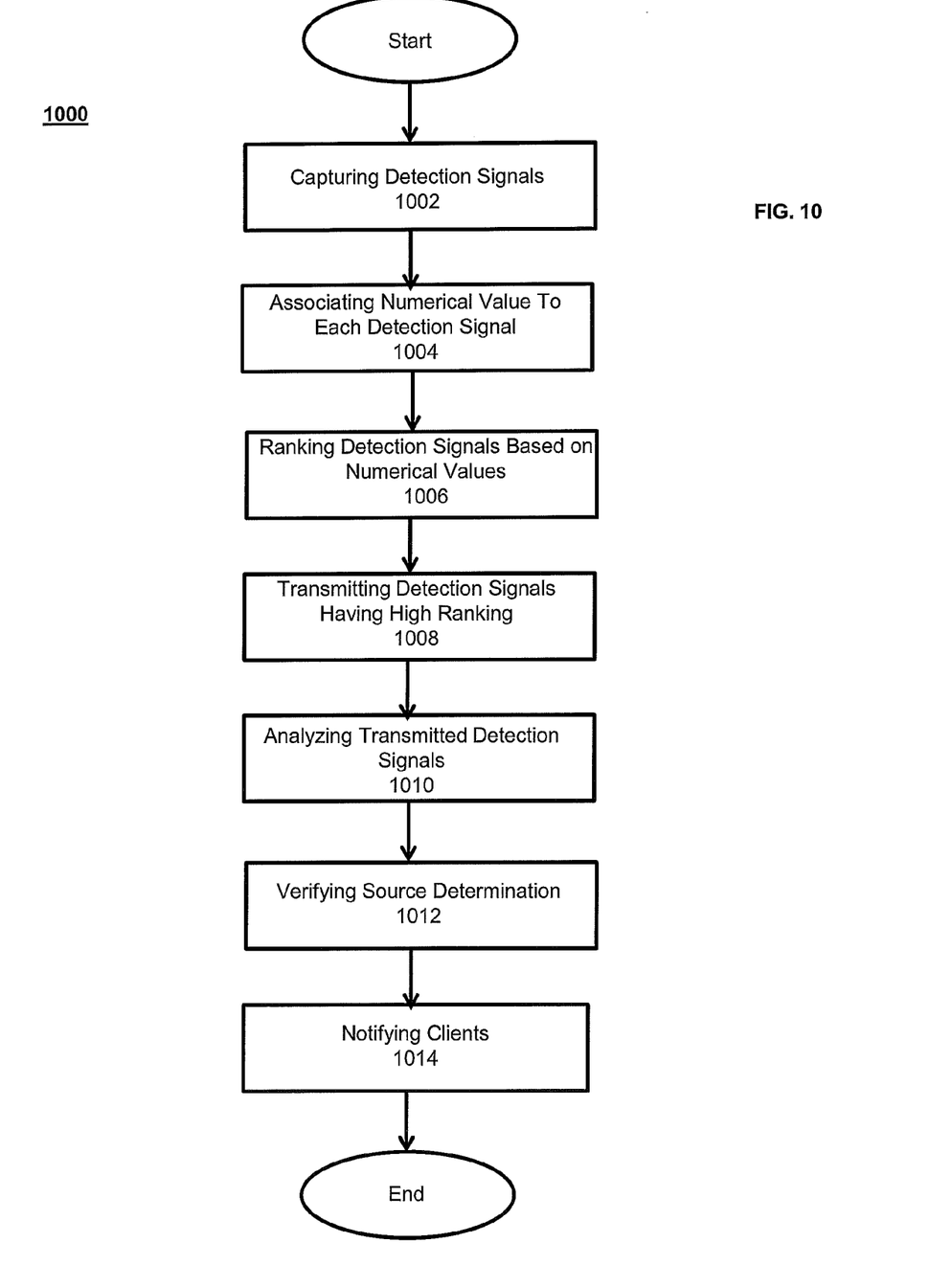
FIG. 10 illustrates a flowchart of a method for remote monitoring according to one embodiment of the invention.

Turning now to FIG. 10, a flowchart of a method 1000 for remote monitoring according to one embodiment of the invention is shown. The method 1000 starts by capturing detection signals at step 1002. Each captured detection signal is then judged and associated with a numerical value based on certain characteristics of the signal at step 1004. The detection signals are then ranked based on their numerical values at step 1006, and a set of higher ranked signals are transmitted to a server, computer network, etc. for further analysis at step 1008. Higher ranked signals correspond to detection signals that have a higher likelihood of being associated with a particular source.

The method 1000 has a step 1010 of analyzing the transmitted detection signals. The analyzing determines whether each of the detection signals correspond to a particular type of source, and if so, the source is identified (e.g., right whale audio signal). The method then transmits the information about the identified sources to a verifying source determination step 1012. The verifying source determination step 1012 checks the results from the analyzing transmitted detection step 1010 to further validate the data and minimize occurrences of false identification of sources. Once analyzing occurs, the method 1000 proceeds to a step 1014 of notifying clients of the detected sources in a specific geographical region, and then the clients may act appropriately based on the information provided. Clients may be notified by subscribing to a data stream of reports via email, telephone, or AIS.

In the example of sightings of right whales near a particular buoy, it is envisioned that vessels would reduce their speed in that area and provide a lookout to visually check whether right whales might collide with the vessel. For other terrestrial, atmospheric, or extraterrestrial type systems, the client receiving the information about the source may perform other appropriate actions based on the type of system employed. For example, systems that provided information about an intruder in an unauthorized geographical area might facilitate forwarding of such source information to local governmental authorities for investigation of the trespass. Alternatively, the owner of the geographical area identified as having a source located therein may prefer to investigate his or her property.

While the invention has been described with reference to particular embodiments, those skilled in the art will recognize that many changes may be made thereto without departing from the scope of the invention. Each of these embodiments and variants thereof is contemplated as falling with the scope of the claimed invention, as set forth in the following claims.

The invention claimed is:

1. A system for remote monitoring of a location to identify sources generating sound signals, comprising:
    a data detection device monitoring an area by receiving and recording sound signals generated by one or more sources located in the area, wherein the data detection device comprises a hydrophone separate from a buoy;
    said data detection device including a processor, the processor configured to compare characteristics of a segment of the recorded sound signals to a recorded library of characteristics, the characteristics comprising a minimum frequency value and a maximum frequency value, the processer assigning each segment a numerical value between 1 and 10 based on the comparison and defining a priority set of recorded sound signals having a frequency between 50 and 350 Hertz, wherein a higher numerical value corresponds to a higher likelihood that the recorded sound signal is associated with a particular source;

a communication infrastructure including a first communication link and a second communication link transmitting the priority set of recorded sound signals to a processing device, wherein the first communication link and the second communication link are of different types or modes and said communication infrastructure transmitting the priority set of recorded sound signals over one of the two different communication links, and if transmission is interrupted, then said communication infrastructure switches transmission to the other of the two different communication links;

the processing device generating an alert when the priority set includes one or more recorded sounds signals of the particular source; and a client device receiving the alert indicating the particular source is detected in the area.

2. The system for remote monitoring of a location to identify sources generating sound signals according to claim 1, wherein the particular source is a marine animal.

3. The system for remote monitoring of a location to identify sources generating sound signals according to claim 1, wherein one of the first communication link and the second communication link is an Iridium satellite phone communication link.

4. The system for remote monitoring of a location to identify sources generating sound signals according to claim 1, wherein one of the first communication link and the second communication link is a cellular phone communication link.

5. The system for remote monitoring of a location to identify sources generating sound signals according to claim 1, wherein the client device comprises a vessel.

6. The system for remote monitoring of a location to identify sources generating sound signals according to claim 2, wherein the marine animal is a right whale.

7. The system for remote monitoring of a location to identify sources generating sound signals according to claim 1, wherein the characteristics further include and a duration of time, an amplitude, a bandwidth, and a starting frequency value.

8. The system for remote monitoring of a location to identify sources generating sound signals according to claim 1, wherein the segment is 2 seconds.

9. A method for determining a source located within an area, comprising the steps of:

recording by a data detection device sound signals generated by a source located in the area, the data detection device comprising a hydrophone separate from a buoy;

comparing by a processor of the data detection device characteristics of a segment of the recorded sound signals to a recorded library of characteristics, the characteristics comprising a minimum frequency value and a maximum frequency value;

assigning by the processor of the data detection device a numerical value to each segment based on the comparing step, the numerical value between 1 and 10;

defining by the processor of the data detection device a priority set of recorded sound signals with each of the recorded sound signals having a frequency value between 50 and 350 Hertz, wherein a higher numerical value of each segment of recorded sound signal corresponds to a higher likelihood that the recorded sound signal is associated with a particular source;

transmitting by one or more communication links the priority set of recorded sound signals to a processing device;

comparing by the processing device each recorded sound signal of the priority set to a library of source recordings;

sorting out by the processing device one or more recorded sound signals from the priority set that are not found in the library;

generating by the processing device an alert when the sorted priority set includes one or more recoded sound signals of the particular source; and sending the alert to a client device indicating the particular source is detected in the area.

10. The method for determining a source located within an area according to claim 9, wherein said transmitting step further comprises the step of:

switching between two or more different communication links when transmission is interrupted on one of the two or more different communication links.

11. The method for determining a source located within an area according to claim 10, wherein one of the two or more different communication links is an Iridium satellite phone communication link.

12. The method for determining a source located within an area according to claim 10, wherein one of the two or more different communication links is a cellular phone communication link.

13. The method for determining a source located within an area according to claim 9, wherein the client device comprises a vessel.

14. A system for remote monitoring of a location to identify sources generating sound signals, comprising:

a data detection device monitoring an area by receiving and recording sound signals generated by one or more sources located in the area;

said data detection device including a processor, the processor comparing characteristics of a 2 second segment of each recorded sound signal to a recorded library of characteristics, the characteristics comprising one or more selected from the group: a duration of time, an amplitude, a bandwidth, and starting frequency value a minimum frequency value, a maximum frequency value, the processer further assigning each segment a numerical value between 1 and 10, wherein a higher numerical value corresponds to a higher likelihood that the recorded sound signal is associated with a right whale marine animal;

a communication infrastructure including a first communication link and a second communication link transmitting the priority set of recorded sound signals to a processing device, wherein the first communication link and the second communication link are of different types or modes and said communication infrastructure transmitting the priority set of recorded sound signals over one of the two different communication links, and if transmission is interrupted, then said communication infrastructure switches transmission to the other of the two different communication links;

the processing device generating an alert when the priority set includes one or more recorded sounds signals of the particular source; and a vessel receiving the alert indicating the particular source is detected in the area.

15. The system for remote monitoring of a location to identify sources generating sound signals according to claim 14, wherein the data detection device comprises a hydrophone separate from a buoy.

16. The system for remote monitoring of a location to identify sources generating sound signals according to claim 14, wherein the data detection device records sound signals having a frequency between 50 and 350 Hertz.

* * * * *